United States Patent
Strongin

[19]

[11] Patent Number: 6,141,743
[45] Date of Patent: Oct. 31, 2000

[54] TOKEN-BASED STORAGE FOR GENERAL PURPOSE PROCESSING

[75] Inventor: Geoffrey Strongin, Austin, Tex.

[73] Assignee: Advanced Micro Devices, Inc., Sunnyvale, Calif.

[21] Appl. No.: 09/154,689

[22] Filed: Sep. 17, 1998

[51] Int. Cl.[7] .................................................. G06F 12/00
[52] U.S. Cl. ............................. 712/33; 709/247; 710/3
[58] Field of Search .............................. 712/33; 709/247; 710/68, 106, 128, 3

[56] References Cited

U.S. PATENT DOCUMENTS

| | | | |
|---|---|---|---|
| 4,008,460 | 2/1977 | Bryant et al. | 711/136 |
| 4,881,075 | 11/1989 | Weng | 341/87 |
| 4,951,139 | 8/1990 | Hamilton | 358/135 |
| 5,237,460 | 8/1993 | Miller et al. | 360/8 |
| 5,247,638 | 9/1993 | O'Brien et al. | 710/68 |
| 5,247,646 | 9/1993 | Osterlund et al. | 710/68 |
| 5,357,614 | 10/1994 | Pattisam et al. | 710/68 |
| 5,396,343 | 3/1995 | Hanselman | 358/426 |
| 5,420,696 | 5/1995 | Wegeng et al. | 358/458 |
| 5,455,577 | 10/1995 | Slivka et al. | 341/51 |
| 5,461,625 | 10/1995 | Cho | 370/85.5 |
| 5,491,803 | 2/1996 | Herrmann | 710/107 |
| 5,563,595 | 10/1996 | Strohacker | 341/106 |
| 5,606,428 | 2/1997 | Hanselman | 358/404 |
| 5,649,151 | 7/1997 | Chu | 709/100 |
| 5,778,255 | 7/1998 | Clark | 710/68 |
| 5,835,792 | 11/1998 | Wise | 710/68 |

*Primary Examiner*—Eric Coleman
*Attorney, Agent, or Firm*—Conley, Rose & Tayon, PC; B. Noël Kivlin

[57] ABSTRACT

The present invention discloses a system and method for compressing data transmitted over a bus between a bus device, such as a CPU or an I/O device, and a memory subsystem. The data is compressed into data tokens and the tokens are stored in and retrieved from the memory subsystem. The CPU may also contain a token-generating circuit. Content addressable memory is employed to compare the data against expected bit patterns for generating the data tokens. Upon encountering a match, the content addressable memory returns the data token associated with the matching bit pattern. Both the bus device and memory subsystem may have the capability to compress data into tokens and re-expand data when necessary. A method is also employed for indicating to a device receiving data whether the data is a token or not.

23 Claims, 3 Drawing Sheets

TOKEN-BASED STORAGE FOR GENERAL PURPOSE PROCESSING

BACKGROUND

1. Field of the Invention

The present invention relates generally to the design and development of microprocessor and memory systems within computers. More particularly, the present invention relates to reducing latency and increasing bandwidth of data transfers between a microprocessor and memory subsystem. Still more particularly, the present invention relates to a technique for compressing blocks of data, transmitting the compressed data between the microprocessor and memory subsystem, and re-expanding the compressed data.

2. Description of the Relevant Art

Microprocessors are the "brains" of a computer. Typically, a microprocessor manipulates data contained in memory. The data must be transmitted from the memory to the microprocessor for manipulation. After the data has been manipulated by the microprocessor, the manipulated data may be transmitted back to the memory subsystem for storage. A paramount concern of computer designers is the speed at which a computer operates. Computer speed has increased more than ten-fold in the last ten years. The speed at which a computer operates is a function of the operating speed of the computer's sub-components (microprocessors, memory, video controllers, audio controllers, etc.). Extensive research and development in semiconductor technology has resulted in microprocessor designs that have the capability to operate much faster than the system memory with which microprocessors cooperate, thus limiting overall system performance. Competing demands upon the bus structures which interconnect a microprocessor to system memory can further limit overall performance.

Computers with high memory latencies may require that the microprocessors enter wait states, or pause, thus reducing the processor's throughput. Memory latency may be negatively impacted due to inefficient utilization of the bus structure's available bandwidth.

Data compression may generally be employed in systems where large amounts of data must be conveyed through a medium of limited bandwidth. Data compression techniques have also been employed to compress the size of an entire data file on a disk. Data compression also reduces the transfer time of a file across a local or wide area network. Data compression algorithms typically take advantage of the correlated nature of data. That is, a relationship often exists between data values within a file. For example, a block of 100 bytes of data in which each byte contains the same value (e.g., 0) is highly correlated. At the other extreme, a block of 100 bytes of completely random data has no correlation. Other collections of data fall between these two extremes. Video and audio data typically are relatively highly correlated. Some data compression algorithms take advantage of the correlated nature of a data set by employing a "shorthand" representation of the full data set. For instance, a bit pattern comprising one hundred 0-values might be represented simply by "100 0" indicating 100 bytes of the value 0.

It would be advantageous to use data compression techniques to accommodate data transfers between a microprocessor and memory in a computer, thereby more efficiently utilizing the bandwidth of the bus structures and reducing latency.

SUMMARY OF THE INVENTION

The problems outlined above are in large part solved by a system and for compressing data communicated between a microprocessor and memory subsystem. In one embodiment, compressed data, in the form of "tokens", is transferred between a microprocessor and a system memory.

A content addressable memory (CAM) is used to store expected bit patterns and associated tokens. Data compression is achieved by comparing a given bit pattern with those stored in the CAM and, if a match is found, replacing the bit pattern with a token associated with that bit pattern. CAMs may be used in both the CPU core and memory subsystem to effectuate compressions and re-expansions in both components.

Programming of the CAMs may be fixed or adaptable. If fixed, the CAM contents do not change during normal operation of the system. If adaptable, the contents of the CAM are alterable depending upon the type and correlation of data communicated across the computer bus.

By transmitting tokens which typically comprise many fewer blocks than the data blocks they represent, bus utilization may be improved, thereby improving overall performance of a computer system.

Tokens may further be stored in the system memory. State of the art personal computers typically include many megabytes of random access memory (RAM). Many software applications, especially those running in a Windows™ environment in which multiple windows and applications may be open simultaneously, require almost all of the available RAM for proper and efficient operation. Storing compressed data as tokens in the system memory provides more efficient use of the memory for the application software.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENT

Figure 1:
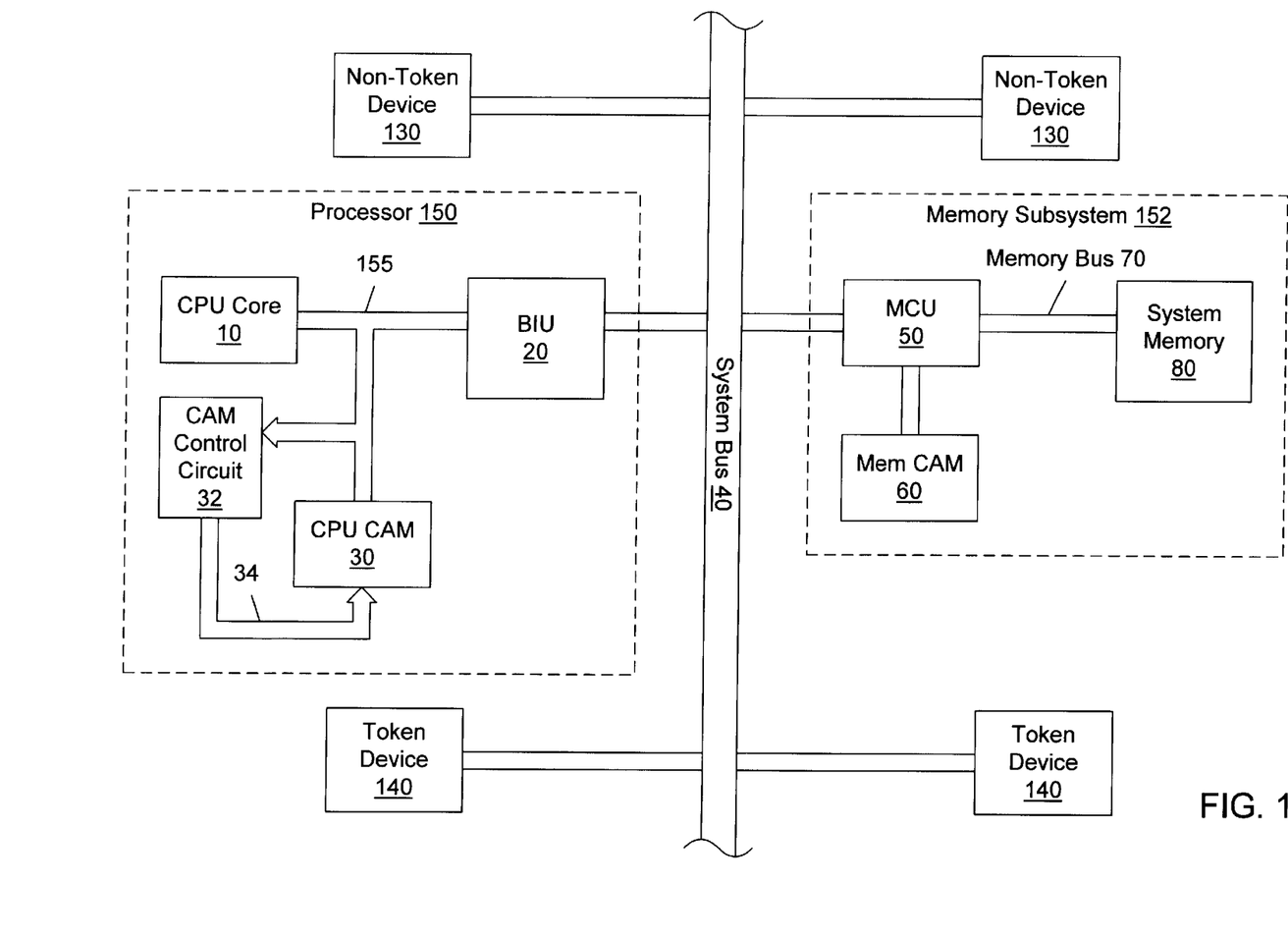
FIG. 1 is a block diagram representation of the present invention.

Referring now to FIG. 1, a computer system implementing a token-based storage preferably comprises a processor 150 and a memory subsystem 152. The processor 150 includes a central processing unit (CPU core) core 10, a bus interface unit (BIU) 20, and a CPU core content addressable memory (CPU core CAM) 30 coupled via a CPU core local bus 155. A CAM Control Circuit (CCC) 32 is also shown coupled to the CPU core local bus 155 and to the CPU core CAM 30 (via a CAM control bus 34). The BIU 20 couples the processor's CPU core local bus 155 to a system bus 40. The memory subsystem 152 includes a memory controller (MCU) 50, a system memory 80, and a memory content addressable memory (MEM CAM) 60. The memory controller 50 is coupled to the system bus 40 and receives and transmits data from and to the BIU 20. Further, the MCU 50 directs data transfers to (write operations) and from (read operations) system memory 80 via a memory bus 70. System memory 80 preferably comprises dynamic random access memory (DRAM). This architecture allows blocks of data to be transferred between the CPU core 10 and the system memory 80 during read and write cycles.

Other devices typically couple to the system bus 40 such as video and disk drive controllers. Token devices 140 implement the token feature and non-token devices 130 do not implement the token feature. Both token and non-token devices may write data to and read data from the memory subsystem.

The data blocks transferred between the processor 150 and memory subsystem 152 during write and read operations often are correlated and, thus, are amenable to data compression techniques pursuant to the principles of the present invention. According to the preferred embodiment, data compression algorithms are used to compress the data into "tokens." A token is a representation of a bit pattern, or block of data including several bytes. A token is preferably expressed with bits fewer than the number of bits comprising the data pattern it represents.

During data write operations, the processor 150 reduces blocks of data to tokens, a process referred to as "tokenizing" data. Tokenized data is then transmitted over the system bus 40 to the MCU 50 in a token transfer cycle (TTC). A token transfer cycle may be indicated by asserting one or more control signals associated with bus 40. The tokenized data subsequently is written into the system memory 80. Alternatively, the MCU 50 may re-expand the tokenized data received from the processor 150 into the full data block that the token represents and store the re-expanded data block, rather than the token, in the system memory 80.

During read operations, the processor 150 requests data stored in the memory subsystem 152. If the data was stored in the system memory 80 as a token, the token is retrieved from the system memory and transmitted over the memory bus 70 to the MCU 50 and then over the system bus 40 to the processor 150. The processor then re-expands the token into the complete data block for further manipulation of the data. If the data was stored in the system memory 80 as the full data block (i.e., not in token form), the MCU 50 may tokenize the data block and then transmit the token over the system bus 40 to the processor 150 for re-expansion by the CPU core.

In the preferred embodiment, tokenizing a block of data is accomplished using a CAM.

A CAM provides a token corresponding to an associated block of data for a correlated or repeating bit pattern in a block of data. While tokenizing a block of data, the bit pattern comprising the data block is compared to the entries in the CAM. If there is a match between a specific bit pattern and a bit pattern programmed into the CAM, the CAM returns the token associated with that specific bit pattern. The bit pattern is replaced by the token, thereby reducing the size of the data to be transferred. Preferably, a CAM contains tokens for data patterns most likely to be encountered in typical communications for a given application.

Because both the processor 150 and memory subsystem 152 communicate using tokenized data, a token CAM must be accessible by both devices. In one embodiment, a single CAM is accessible by the processor and memory subsystem 152. In the depicted embodiment, separate CAM circuits are provided for by the processor and memory subsystem.

As shown, processor 150 includes CPU core CAM 30 and the memory subsystem 152 includes MEM CAM 60. When requesting data to be written into system memory 80, the CPU core 10 (or other circuitry associated with CAM 30) compares the bit patterns comprising the data with the bit patterns stored in CPU core CAM 30. If a match is found, an associated token is used to replace the matching bit pattern. The token is transmitted over the system bus to the memory subsystem 152 and stored in system memory 80.

During a read operation, upon receipt by the CPU core of requested data from the system memory 80, the CPU core determines if the data represents a token. If it does, the CPU core compares the received token with the token values in the CPU core CAM 30 and re-expands the token into its complete data equivalent with the matching bit pattern from the CPU core CAM. The process for determining if the data represents a token is explained below.

Similarly, if normal data is received by the memory subsystem 152, the MCU 50 may use MEM CAM 60 to tokenize data before storing the data in the system memory 80. This normal data may be received from computer devices that do not implement the token feature such as non-token devices 153. Tokenizing such data before writing it to system memory advantageously allows the data to be stored in fewer bytes of memory, thereby increasing effective memory storage capacity. MEM CAM 60 also is used to re-expand data stored as a token in system memory when non-token devices 130 read data from system memory.

In the preferred embodiment, the CPU core CAM 30 and MEM CAM 60 are programmed identically, with the contents of MEM CAM 60 mirroring that of CPU core CAM 30. Identically programmed circuits in the processor and memory control ensures that compressed and expanded data are identical.

Consistent with the preferred embodiment, the CPU core CAM 30 may be a separate, discrete device in the processor 150. Alternatively, CPU core CAM 30 may be implemented as part of the BIU 20. Providing a BIU that tokenizes and re-expands data minimizes the impact on the other subcomponents (not shown) comprising the CPU core 10.

Figure 2:
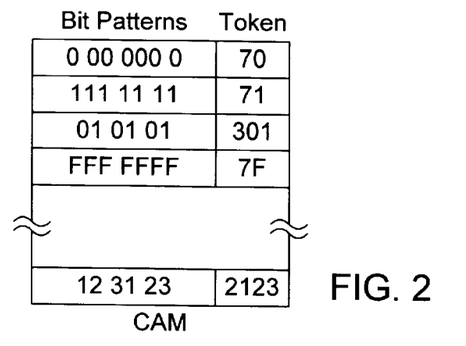
FIG. 2 is an exemplary illustration of the content addressable memory of FIG. 1, including bit patterns and associated tokens.

FIG. 2 is an exemplary embodiment of a token CAM. A data pattern comprising seven consecutive bytes with the value 0, for example, can be represented by the token "7 0" as shown in the first entry of the CAM table. If a pattern of data, therefore, contains a series of seven bytes of 0, then comparison of that bit pattern to the entries in the CAM will result in the CAM returning the token "7 0" for replacement of the seven bytes of 0-values. A list of data patterns and tokens in a CAM may be fixed or adaptive. If fixed, the CAM is pre-programmed for the expected type of data to be encountered and does not change during operation of the process.

Quality of data may change over time. For example, a process typically initializes all data variables to 0. Consequently, a CPU core for such a process manipulates mainly 0-values. However, as the process progresses, the values of the variables change to non-zero values. At some point in time, it may become highly unlikely for a block of data to include a series of 0-values. Increased performance, therefore, may be achieved by altering the CAM's programming on-the-fly.

Figure 4:
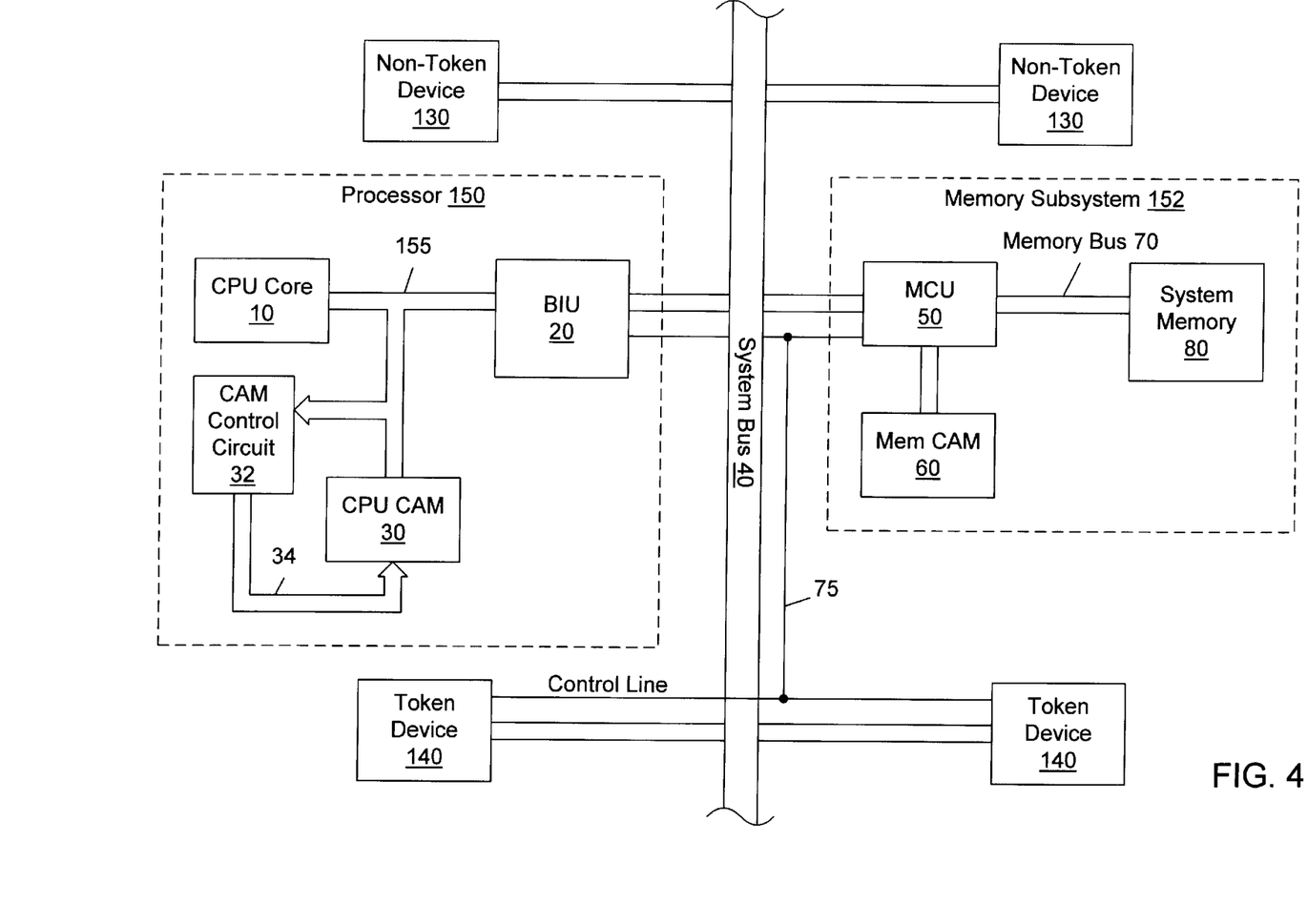
FIG. 4 is a block diagram representation of the present invention including a control line for indicating the presence of token devices.

Run-time monitoring and programming of CPU core CAM 30 may be accomplished through a CAM Control Circuit (CCC) 32 (shown in FIGS. 1 and 4). The CCC 32 is coupled to the CPU core local bus 155 to receive all bit patterns that are generated by the CPU core, or received by the CPU core—either through the CPU CAM 30 or through a memory read operation. When the CPU core CAM 30 is initialized with a set of bit patterns, the same bit patterns are also stored in the CCC 32. As the processing progresses, the CCC 32 keeps track of data bit patterns that are not stored in the CPU core CAM 30, and generates appropriate token for a bit pattern that has a predetermined level of correlation between its constituent bits. This bit pattern, along with its newly generated token, is then stored in the CPU core CAM 30 through the CAM control bus 34. If the size of the CPU core CAM 30 is fixed, then the new token may replace a less frequently accessed token, as determined by the CAM Control Circuit 32. The first entry, for example, in the CAM in FIG. 2 may be reprogrammed to a more likely bit pattern. A similar control circuit (not shown) may also be employed for the MEM CAM 60. Once the content of one of the CAMs (either CPU core CAM 30 or MEM CAM 60) is changed, a CAM update message preferably is sent to the other CAM so as to maintain identical contents in each CAM.

As described, system memory often is accessible by devices other than the CPU core, such as, for example, the non-token device 130 in FIG. 1. During read operations, such devices may be incapable of distinguishing between data stored in memory in token form and uncompressed data. Similarly, certain devices may be incapable of re-expanding tokenized data even if the device was given an indication that the data block requested in a read cycle was a token. When the MCU responds to a read operation, the MCU 50 ascertains whether the data requesting device implements the token feature. If the data requesting device is a non-token device 130, the MCU must re-expand any requested tokenized data before communicating the data to the requesting device. If the data requesting device is the processor 150 or other token device 140, the MCU 50 preferably transmits a signal to the requesting device to indicate whether the targeted data represents a token or not. With that information, the MCU 50 or other token device 140 can re-expand tokenized data before further processing. Regardless of whether the data requesting device implements the token feature, the memory subsystem must be able to keep track of which system memory data are tokens and which are uncompressed data. This may be accomplished using dedicated bits.

Figure 3:
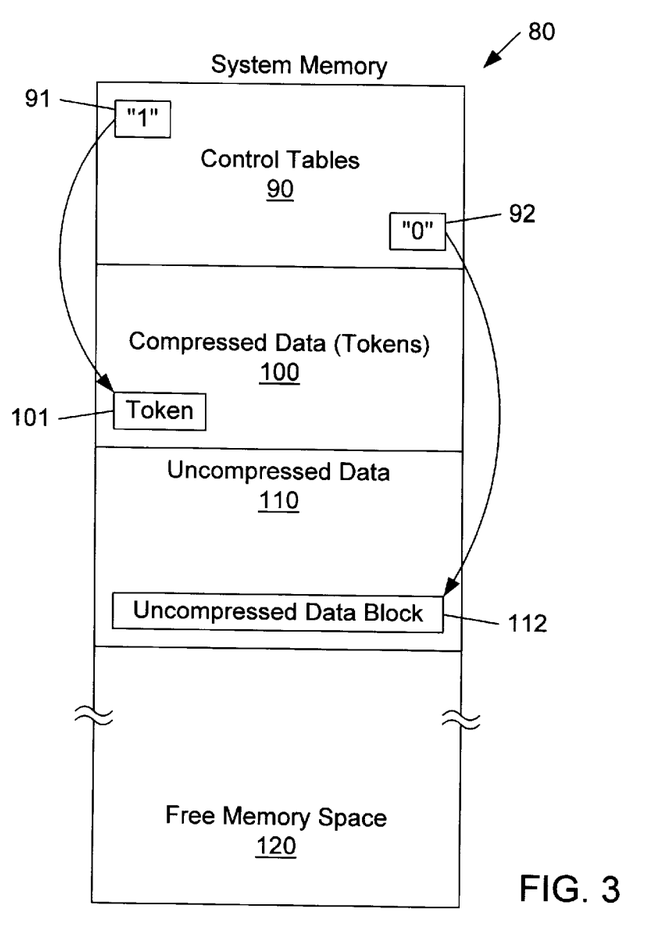
FIG. 3 is an exemplary illustration of the contents of the system memory.

Referring now to FIG. 3, the memory subsystem preferably tracks the status of data (compressed versus uncompressed) by including in system memory 80 control tables 90, compressed data 100, uncompressed data 110, and free memory space 120. The free memory space 120 includes memory locations that are not presently storing current, valid data, but could be used to store compressed or uncompressed data. The compressed data memory space 100 includes tokenized data. The uncompressed data memory space 110 includes data that has not been tokenized.

The control tables 90 include status information indicating which data blocks are tokens and which blocks represent uncompressed data. Preferably, one or more bits in the control tables are associated with each block of data. For example, bit 91 and compressed data block 101 are associated as indicated by the linking arrow, while bit 92 is associated with uncompressed data block 112. A bit value of "1" may be used to indicate that the associated data block is embodied as a token. Accordingly, the "1" in bit 91 indicates that the associated data block 101 is a token. Conversely, a control table bit value of "0," as in bit 92, indicates that an associated block, block 112 with respect to bit 92, contains uncompressed data. In the alternative, a bit value of "0" could be used to indicate a token, while a "1" indicates uncompressed data. Also, various methods may be used to link a control bit in a table to an associated data block in another part of the system memory. Where blocks of storage contain tokenized data, an opportunity exists to increase the amount of memory made available to store tokens or non-tokenized datablocks. In such a system, a memory controller 50 may be configured to map the final physical storage space to a larger virtual address space.

Further, a mechanism is desirable to indicate to the MCU the format of data written to system memory during write cycles and whether the data requesting device implements the token feature during read cycles and if so, whether the requested data is a token. Such a method should preferably allow non-token devices to read from and write to system memory with little, if any, impact on their designs to minimize development cost of the computer system.

A variety of techniques may be used to implement this feature. One exemplary method is to include control bits with each block of data written to and read from the memory subsystem. These control bits could be encoded to reflect whether the associated data block represents a token. A multitude of encoding schemes for the control bits may also be implemented.

For example, a control byte including all logic "1's" might indicate the presence of a token, whereas all "0's" might indicate the absence of a token. Further, either the absence of the control bits or an all "1" or all "0" control code might also indicate the absence of a token. In this manner, during write cycles token devices could indicate to the MCU 50 whether the data block to be written to system memory 80 is a token or not by using the appropriate code (e.g., control bits with all "1's" or all "0's"). In the preferred approach, an additional control line 75 may be implemented as described below.

Without modification, existing non-token devices would be unable to implement the control bit scheme and the MCU, upon detecting the absence of the control bits or appropriate control code, would understand that the data writing device does not implement the token feature and is not writing a token to system memory. In this situation, the MCU 50 may or may not tokenize the data before writing it to system memory. During read cycles, the MCU could set the control bits appropriately to indicate to the data requesting device whether the requested data is a token or not. Of course, existing non-token devices that do not implement this control bit scheme would be incapable of interpreting this control byte and might erroneously assume the control byte is part of the data itself.

One solution to this problem is to include a control byte in the read request command to the MCU 50. This control code may be encoded to indicate that the read request is from a token device. Accordingly, if the MCU receives a read request command with such a control code, the MCU will retrieve the requested data from system memory and communicate the data to the requesting token device with appropriate control bits indicating whether the data is a token as discussed above. If the requesting device is a non-token device 130, the MCU will not receive a token-indicating control code during the read request and therefore, will understand that any data requested stored in memory as a token must be expanded before transmitting the data to the requesting device.

An alternative method for indicating the nature of the requesting or target device is to provide signals on an existing control line that is not used during data transactions. Alternatively, an additional control line 75 may be added to the system, as shown generally in FIG. 4. Control line 75 preferably is activated by the processor during memory subsystem transaction to indicate that the processor implements the token feature. Preferably control line 75 also is assertable by token devices 140.

If the control line is asserted during a write cycle, it indicates to the MCU 50 that the data to be written to system memory represents a token. If the control line is not asserted, then the MCU treats that data as uncompressed. The control line will not be asserted when either (1) the writing device is not a token compatible device or (2) the data is compatible, but not sufficiently correlated to warrant compression.

During read cycles, the control line 75 preferably is asserted twice if token data is transmitted over the system bus—first when the read cycle is initiated by a token device and a second time if the MCU returns data comprising a token to a data requesting token device. The data requesting device asserts the control line indicating to the MCU that the device implements the token feature. If no such control line is asserted, then the MCU knows the data requesting device is a non-token device 130. Once the requested data is retrieved from system memory, the MCU asserts the control line to indicate to a data requesting token device whether the data is a token. If the requesting device is a non-token device, the MCU re-expands any data requested that was stored in system memory 80 as a token before communicating the data over the system bus 40. Further, detection by a token device of the activation of the control line by the MCU 50 during a read cycle indicates to the token device that the requested data is a token and, thus, the token device may re-expand the data. Failure by the MCU to assert the control line during a read operation indicates to a token device that the data requested is not a token. Without modification, non-token devices will not be able to detect the assertion of the control line 75, but this inability is immaterial because the MCU is already aware that the device does not implement the token feature and correspondingly will only provide uncompressed data to a data requesting, non-token device.

In a typical computer system, system bus activity is controlled by a bus interface unit like the BIU 20 shown in FIG. 1. It may be preferable, therefore, for the BIU alone to implement the control byte or control line approaches described above. In this way, non-processor bus devices need not be modified for implementation of the token feature. In this embodiment, the BIU 20 assumes the responsibility for alerting the memory subsystem 152 to the presence of tokens during write operations initiated by the processor or other bus device and expands tokens received from the memory subsystem during read operations initiated by any bus device. During write operations, the BIU monitors the system bus for the presence of uncompressed data that can be tokenized (i.e., data for which a match in the CPU CAM is found), tokenizes the data, and writes the token to the system memory 80. During read operations, the BIU similarly monitors the requested data retrieved by the MCU for the presence of a token, re-expands the data if it is a token, and transmits the expanded data to the data requesting device. The BIU preferably obtains status information regarding the token/non-token capabilities of all devices that may transact with the memory subsystem 152. This status information preferably is obtained during initialization. During initialization of a typical computer system, each device is polled by a polling device such as a BIU to determine certain status and configuration information such as whether the device is on or off and whether that device is a token or a non-token device. For a device that implements the token feature, an additional piece of status information preferably is provided by that device to indicate that the device implements the token feature. For a device that does not implement the token feature, this additional status information is not available, thereby indicating to the BIU that the device does not support the token feature of the present invention.

An additional problem exists when the CPU core 10 has written a token to the system memory 80 and an external device incapable of interpreting tokens tries to access a subset of the block of data represented by the token. For example, an external device may try to change the third byte in a pattern of seven bytes of "0" values. If, however, that pattern has been reduced to the token "7 0," the targeted third byte does not physically exist in system memory. Because the specific byte or bytes targeted by the external device do not exist per se in the system memory, but rather are derived from the token, the token must completely re-expand the data block, or at least partially re-expand the block, to gain access to the targeted bytes. The memory controller may retokenize (may be with a different token) the data block immediately after completion of the read or write operation by the external device, if that data block is still capable of being compressed. Alternatively, the memory controller may not retokenize the data until the CPU core 10 or other token device 140 send a read request for that data to the memory controller.

Where successive blocks of data are generated, the opportunity exists for the CPU core 10 (or memory controller 50) to combine more than one token into a single TTC. In this way, a further increase in performance of the communication can be achieved. In one implementation, multiple tokens may be transferred through a single TTC by converting individual datablocks into appropriate individual tokens, and then combining these tokens during the TTC. Alternatively, the datablocks could be combined and a single token representing the combined block could be generated. If such combining takes place during the time while other activity is utilizing the system bus, it is possible to accomplish it without additional latency penalties.

Several factors affect the performance of the token-based data transfer described herein. The most important factor is P, the percentage of datablock transfers with highly correlated data values. This factor is dependent on the data usage, but for some types of data (particularly video or graphics data) this value is expected to be high. Another factor which affects the performance is the size of the token in units of data transfer cycles. Tokens which can be transferred with a single data transfer operation are preferred to tokens which take longer. The length of time needed to examine and convert the datablock into a token also affects the performance. Common coding techniques such as run length or entropy coding may be utilized for generating tokens that could be stored, e.g. in a CAM. Entropy coding, in the preferred embodiment, requires assigning the shortest-length token to the most frequently occurring bit pattern, the next shortest-length token to the next most frequently occurring bit pattern, and so on.

If an entropy code is chosen as a method for generating tokens, then the possibility exists that the specific entropy code implemented in the system could be subject to being reprogrammed from time to time. In such a situation, the optimal entropy code might depend upon the type of processing taking place in the system. Adaptive coding may be preferred for such a system, i.e., the entropy code may be modified to adapt the code to the processing.

Numerous variations and modifications will become apparent to those skilled in the art once the above disclosure is fully appreciated. It is intended that the following claims be interpreted to embrace all such variations and modifications.

What is claimed is:

1. A computer system comprising:

a central processing unit (CPU);

a memory coupled to said CPU;

a token memory coupled to said CPU, wherein said token memory is configured to store a plurality of bit patterns and a plurality of tokens, wherein each of said plurality of tokens is an encoded representation of a corresponding one of said plurality of bit patterns and includes fewer bits than said corresponding one of said plurality of bit patterns, wherein said token memory comprises a first content addressable memory (CAM);

wherein said CPU is configured to identify a first datablock comprising a first bit pattern and to access said token memory with said first bit pattern to thereby retrieve a first token therefor, and wherein said CPU and said memory are configured to transfer said datablock therebetween using said first token therefor.

2. The computer system as in claim 1, further comprising:

a system bus configured to interface said memory with said CPU.

3. The computer system of claim 2, wherein said CPU comprising:

a central processing unit core (CPU core) configured to operate on data bytes to execute program instructions; and a bus interface unit (BIU) coupled to said CPU core via a local bus, wherein said BIU is configured to identify said first datablock received from said CPU core through said local bus upon a memory write operation, to generate said first token in response thereto and to transmit said first token through said system bus to said memory for storage in lieu of said first datablock, and wherein said BIU is further configured to receive said first token from said memory through said system bus upon a memory read operation, to convert said first token into said first datablock and to transmit said first datablock through said local bus to said CPU core in response to a request therefor by said CPU core.

4. The computer system as in claim 2, wherein said CPU comprising:

a central processing unit core (CPU core); and a bus interface unit (BIU) coupled to said CPU core via a local bus, wherein said CPU core is configured to generate said first token for said first datablock and to transmit said first token through said local bus to said BIU upon a memory write operation, wherein said BIU is configured to transmit said first token to said memory for storage in lieu of said first datablock, and wherein said BIU is further configured to receive said first token from said memory through said system bus upon a memory read operation and to transmit said received first token through said local bus to said CPU core in response to a request for said first datablock by said CPU core, wherein said CPU core is further configured to convert said received first token into said first datablock.

5. The computer system according to claim 3, wherein said memory comprises:

a memory controller (MCU) coupled to said BIU through said system bus; and a system memory coupled to said MCU through a memory bus and configured to store data, wherein said MCU is configured to identify said first token transmitted by said BIU during said memory write operation and to send said first token through said memory bus to said system memory for storage, wherein said system memory is configured to store said first token in lieu of said first datablock, and wherein said MCU is further configured to retrieve said first token from said system memory through said memory bus during said memory read operation and to transmit said retrieved first token to said BIU through said system bus.

6. The computer system of claim 5 wherein said first CAM is coupled to said BIU, and wherein said BIU is configured to access said first CAM during said memory write operation to generate said first token and to further access said first CAM during said during said memory read operation to convert said received first token into said first datablock.

7. The computer system according to claim 5, wherein said token memory comprises:

a CAM (content addressable memory) coupled to said BIU and said MCU through said system bus, wherein said BIU is configured to access said CAM during said memory write operation to generate said first token and to further access said CAM during said memory read operation to convert said received first token into said first datablock, and wherein said MCU is configured to access said CAM during said memory write operation to identify said first token transmitted by said BIU through said system bus.

8. The computer system as in claim 6, further comprising:

a non-token device coupled to said system bus and configured to transfer a second datablock in an uncompressed form, wherein said second datablock comprises a second bit pattern; and a token device coupled to said system bus to transfer a third datablock in a compressed form, wherein said third datablock comprises a third bit pattern.

9. The computer system of claim 8, wherein said BIU is configured to detect presence of said non-token device and said token device, wherein said BIU is also configured to access said first CAM to convert said second datablock into a second token for storage in said system memory, wherein said second token being one of said plurality of tokens, and wherein said BIU is further configured to re-expand said second token from said system memory into said uncompressed form for transmission to said non-token device.

10. The computer system as in claim 8, wherein said token memory further comprising:

a second CAM (content addressable memory) coupled to said MCU, wherein said MCU is configured to access said second CAM to convert said second datablock from said non-token device into a second token for storage in said system memory and also to re-expand said second token into said uncompressed form for transmission to said non-token device, wherein said second token being one of said plurality of tokens, and wherein said MCU is further configured to access said second CAM to identify said first token transmitted by said BIU during said memory write operation and also to accomplish transfer of said third datablock from said token device in said compressed form.

11. The computer system according to claim 10, wherein said MCU is configured to detect presence of said non-token device and said token device.

12. The computer system of claim 11, further comprising:

a control line coupling said BIU and said token device with said MCU, wherein said control line enables said transfer of said first datablock between said BIU and said MCU using said first token therefor, and wherein said control line further enables transfer of said third datablock from said token device in said compressed form.

13. The computer system of claim 11, wherein said first CAM and said second CAM contain identical data.

14. The computer system as recited in claim 6, wherein said CPU further comprises said first CAM and said BIU.

15. A method for reducing latency during an access to a memory in a computer system, said method comprising:

identifying a first datablock containing a first bit pattern;

programming a token memory in said computer system with a plurality of bit patterns, said token memory comprising a content addressable memory (CAM);

further programming said token memory with a plurality of tokens, wherein each of said plurality of tokens is an encoded representation of a corresponding one of sad plurality of bit patterns and includes fewer bits than said corresponding one of said plurality of bit patterns;

accessing said token memory and comparing said first datablock with said each of said plurality of bit patterns;

identifying a matching bit pattern from said plurality of bit patterns, wherein said matching bit pattern has data bits identical to said first bit pattern;

encoding said first datablock with a first token, wherein said matching bit pattern corresponds to said first token in said plurality of tokens; and transferring said first token in lieu of said first datablock during said access to said memory.

16. The method according to claim 15, further comprising:

further identifying a second datablock containing a second bit pattern;

accessing said token memory and encoding said second datablock with a second token from said plurality of tokens;

combining said first token and said second token into a third token; and transferring said third token in lieu of said first datablock and said second datablock during said access to said memory.

17. The method according to claim 16, wherein said programming said token memory and said further programming token memory are performed at run time, thereby updating said CAM dynamically.

18. The method as in claim 16, further comprising:

Configuring said computer system to distinguish between an untokenized data and a tokenized data on a system bus, wherein said system bus is configured to interface a plurality of devices in said computer system, wherein said tokenized data comprises said each of said plurality of tokens, and wherein said untokenized data excludes said tokenized data.

19. The method according to claim 16, wherein said transferring said first token in lieu of said first datablock includes:

segregating said memory into a plurality of segments, wherein one of said plurality of segments is configured to stored at least one of said plurality of tokens;

configuring said memory to identify said one of said plurality of segments; and transferring said first token to/from said one of said plurality of segments upon said identification during said configuring said memory to identify said one of said plurality of segments.

20. A central processing unit (CPU) for a computer system comprising:

a central processing unit core (CPU core); [and]

a bus interface unit (BIU) coupled to said CPU core, wherein said BIU is configured to identify a datablock comprising a bit pattern received from said CPU core and to compress said bit pattern into a token, wherein said token is an encoded representation of said bit pattern and includes fewer bits than said bit pattern, and wherein said BIU is further configured to expand said token into said bit pattern upon a request by said CPU core for said datablock, and a content addressable memory (CAM) coupled to said BIU, wherein said CAM is configured to store a plurality of tokens.

21. The CPU as recited in claim 20, wherein said CAM is configured to store a plurality of bit patterns, wherein each of said plurality of bit patterns corresponds to one of said plurality of tokens stored in said CAM, and wherein each of said plurality of tokens is an encoded representation of one of said plurality of bit patterns.

22. The CPU as recited in claim 20 further comprising a CAM control circuit coupled to said CAM; said CAM control circuit configured to monitor contents of said CAM.

23. The CPU as recited in claim 22, wherein said CAM control circuit is configured for removing a less frequently accessed token from said CAM and replacing it with a newly generated token.

* * * * *

UNITED STATES PATENT AND TRADEMARK OFFICE
CERTIFICATE OF CORRECTION

PATENT NO. : 6,141,743  
DATED : October 31, 2000  
INVENTOR(S) : Geoffrey Strongin Page 1 of 1

It is certified that error appears in the above-identified patent and that said Letters Patent is hereby corrected as shown below:

Column 11, claim 15,  
Line 34, please change "sad" to "said".

Column 12, claim 20,  
Line 30, please delete "[and]".

Signed and Sealed this

Fifth Day of February, 2002

Attest:

Attesting Officer

JAMES E. ROGAN  
Director of the United States Patent and Trademark Office